F. J. SEABOLT.
ELECTRIC WINDING MECHANISM FOR CLOCKS AND THE LIKE.
APPLICATION FILED MAY 20, 1912. RENEWED AUG. 6, 1915.
1,180,743.
Patented Apr. 25, 1916.
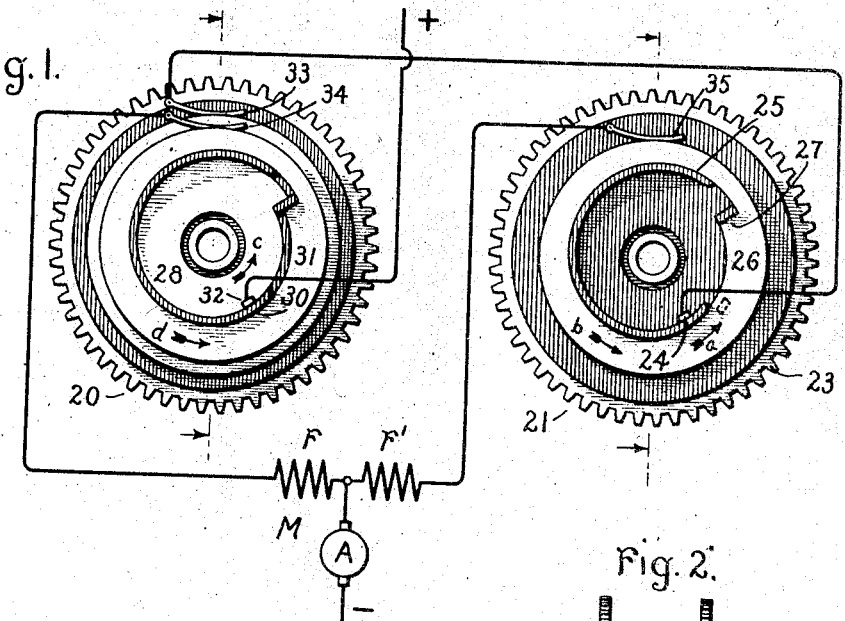
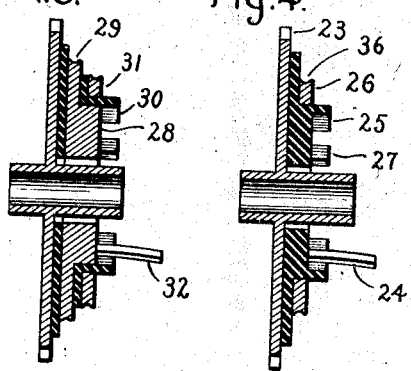
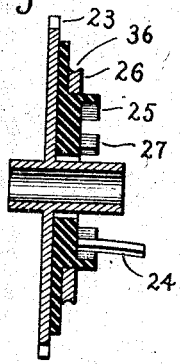
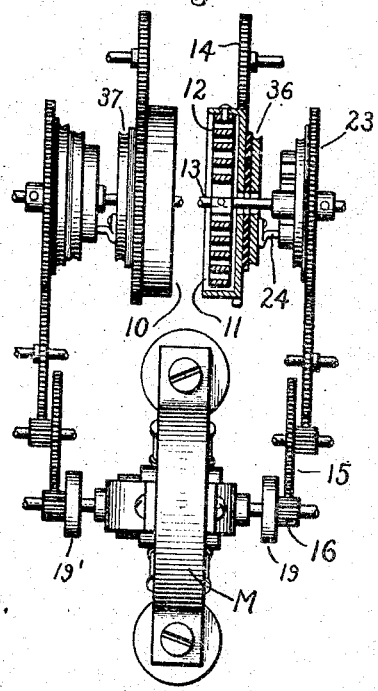
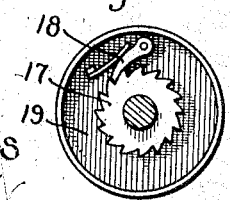
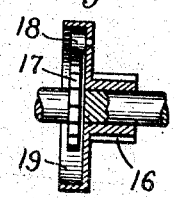

UNITED STATES PATENT OFFICE.

FRANK J. SEABOLT, OF SCHENECTADY, NEW YORK.

ELECTRIC WINDING MECHANISM FOR CLOCKS AND THE LIKE.

1,180,743.  Specification of Letters Patent. Patented Apr. 25, 1916.

Application filed May 20, 1912, Serial No. 698,365. Renewed August 6, 1915. Serial No. 44,117.

*To all whom it may concern:*

Be it known that I, FRANK J. SEABOLT, a citizen of the United States, residing at Schenectady, county of Schenectady, State of New York, have invented certain new and useful Improvements in Electric Winding Mechanism for Clocks and the like, of which the following is a specification.

This invention relates to means for automatically winding spring motor mechanisms, such as clock mechanisms and the like, and has for its object the provision of means of this character whereby an electric motor will be periodically utilized to effect the winding of a plurality of such mechanisms in a reliable, simple and efficient manner.

One of the objects of my invention is to provide means whereby two spring motor mechanisms, as, for instance, a time mechanism and a strike mechanism of the clock, may both be wound automatically by a single electric motor.

In previous patent issued to George H. Rupley, No. 832,747, there is described and claimed electric clock winding mechanism which may be connected with an ordinary lighting or power circuit and be wound and rewound at stated intervals. Among the features of the invention covered by said patent is the provision of means whereby in case the power should fail or become unavailable for any reason when it becomes time for the mechanism to be wound the clock will continue to run for a definite period with the motor circuit closed so that when the power returns the clock spring will be immediately wound up to its original tension. In more recent Rupley Patents, Nos. 897,019 and 897,020, there is described and claimed more simple means for accomplishing substantially the same results. In said latter patents the controlling arrangement for the motor consists of two coöperating elements constituting switch mechanism, one element being driven by the motor in winding the spring while the other is driven by the spring as it runs down. These coöperating elements open and close the motor circuit, the arrangement being such that when the spring runs down a certain amount the circuit will be closed to start the motor and when the motor has wound the spring to its original tension the circuit is opened. In case the power is off when the circuit is closed the members continue in contact until the power returns, when the motor will be operated and the tension returned to the spring. In case the power does not come on after a certain interval the spring mechanism is positively stopped.

In carrying out my present invention I employ a single motor to wind two mechanisms, the connection being such that when the motor rotates in one direction it energizes one mechanism and ratchets or slips over the other, while when the motor is energized to rotate in the opposite direction it will wind the other mechanism and ratchet or slip on the first one. The type of control arrangement for these two motors is preferably of the same general character as that disclosed in said Patent No. 897,020, above referred to, although it is obvious that my invention is in no sense limited to any particular circuit controlling arrangement. In an arrangement of this character it may happen that both controlling mechanisms will be in closed position at the same time, as, for instance, if the circuit should be closed at one controller and the power being off the other motor will continue to operate until the circuit closes on this controller also. In order to overcome this difficulty I have so arranged the controllers that the circuit for one direction of rotation is closed through the other controller so that as soon as one circuit closes it opens the other circuit. In the case of the clock mechanism, for instance, the arrangement may be such that the time mechanism will be given the preference, that is, whenever the time mechanism is being wound, the circuit for the winding of the striking mechanism would be opened and will not be closed until the winding of the time mechanism is completed. In this way the two mechanisms will be wound with a single motor while both mechanisms have positive driving connections with the motor, thereby obviating the necessity of disconnecting one mechanism while the other is being wound.

Other objects and purposes of my invention will appear in the course of the following specification in which I have shown my invention embodied in concrete form for purposes of illustration.

In the accompanying drawing illustrating my invention in concrete form, Figure 1 is a diagrammatic representation of the motor circuits and the controlling devices thereof, Fig. 2 is a view partly in section of the complete mechanism; Fig. 3 is a section through one of the controllers; Fig. 4 is a section through the other controller; Figs. 5 and 6 show a detail of the ratchet connection.

Referring first to Fig. 2, M represents an electric motor for winding the two spring mechanism 10 and 11. One of these mechanisms, as, for instance, 10, may be the clock or any other spring motor mechanism, while 11 may be the striking mechanism. It is obvious, however, that the particular purpose for which these spring mechanisms are used is not an essential feature of my invention, although the arrangement is particularly useful in a clock in which the striking mechanism is employed. It is also obvious that these mechanisms are not necessarily spring operated and when I refer to spring mechanism I mean to include well known equivalents for springs, such as weights. Each of the mechanisms 10 and 11 consists of the usual drum provided with a spring 12, one end of which is secured to the drum while the other end is secured to the shaft 13 in the usual way. When the shaft 13 is rotated in the proper direction, the spring will be wound up and the drum will thereupon drive whatever may be connected with it, as for instance, through the gear 14. The shaft 13 is geared down to the motor through gearing 15 to the pinion 16 on the motor shaft. This pinion has a ratchet connection with the motor shaft as shown in Figs. 5 and 6. Any suitable connection of this sort may be employed, but for purposes of illustration I have shown a ratchet wheel 17 on the motor shaft coöperating with a pawl 18 pivoted on the inside of a drum 19 secured to the pinion 16. It is obvious that when the motor M rotates in the proper direction the shaft 13 will be rotated to wind the spring 12, while when the motor rotates in the opposite direction the gearing 15 will not be operated. On the opposite end of the motor shaft is a similar arrangement for winding the spring within the drum 10 so that when the motor runs in the opposite direction, that is, in the direction in which the pinion 16 ratchets on the motor shaft, the spring in the drum 10 will be wound.

Associated with each of the spring mechanisms is a circuit controller, the arrangement of which will best be seen by reference to Fig. 1. In Fig. 1 the controller associated with the spring mechanism 10 is shown at 20, while the controller associated with the spring mechanism 11 is shown at 21. The controller 21 consists of two moving elements, one of which is a disk secured to the gear 23 so as to rotate when the spring is wound up by the motor, while the other moving element is a spring finger or contact 24 secured to the drum 11 so as to rotate as the spring runs down. The disk secured to the gear 23 is provided with a rib 25 which is eccentric with reference to its axis of rotation and extends only about three-quarters of the way around. The finger 24 engages this rib 25 which is of insulating material and as the finger and rib rotate with reference to each other the spring contact 24 will be placed under tension. This will be clearly seen by reference to Fig. 1. Suppose that the spring is running down and therefore that the contact 24 is rotating in the direction of the arrow $a$. The contact is pressing against the rib with a pressure which is increasing due to the eccentricity of the rib. When the end of the rib is reached the contact will snap over to the position shown in dotted lines. This will close the motor circuit provided the circuit is not opened at the controller 20 as hereinafter explained, since it will be observed that there is a ring of conducting metal 26 surrounding the rib 24 while inside of the rib is an insulating surface flush with the conducting ring. Assuming, therefore, that the motor circuit is closed and that there is a supply of current, the gear 23 will be driven in the direction of the arrow $b$ carrying with it the rib 24. It will be understood, of course, that the contact travels very slowly around the inside of the rib since the spring runs down slowly. For instance, it may take twenty-four hours or more, depending upon the gearing, etc., for the contact to travel the length of the rib. On the other hand, when the motor is energized the gear 23 and the contact ring 26 secured thereto will rotate rapidly. In some cases it will rotate at a rate which will carry the entire rib past the contact in five seconds or even less, depending upon the gearing, speed of motor, etc. During this winding movement the contact 24 is to all intents and purposes standing still. The contact 24 will therefore be again placed under tension by the rib. When the end of the rib is reached the contact will spring inward onto the insulating surface and stop the motor. This operation will repeat itself continuously, the contact sliding on the inside of the rib as the spring runs down and on the outside of the rib as the motor winds the spring. If when the contact 24 is in engagement with the conducting ring 26 current should fail for any cause, the contact will travel onward until the current does come on when the motor will wind up as before, it being noticed that the motor always winds up to the same point regardless of how much the spring has run down. In case the current should be off for a very long time the contact will engage the stop 27 which will lock the members together and stop the running down of the mechanism.

The operation above described is substantially the same as that disclosed in patent of George H. Rupley No. 897,020, above referred to. The controller 20 is substantially the same as the controller just described so far as the mode of operation is concerned, but instead of having an insulating surface inside of the insulating rib there is a conducting surface 28. The construction of this controller is shown in Fig. 3. It consists of a ring of metal having a groove 29 at its periphery and having a shoulder to receive the insulating rib 30. Outside of the insulating rib is a conducting ring 31 having its surface flush with the surface 28. With this arrangement while the spring in the drum 10 is running down, the contact 32 is moving around inside of the rib 30 in engagement with conducting surface 28 with which the brush 33 is in electrical contact. When the contact 32 snaps outside of the rib it comes into contact with the conducting ring 31 which is in electrical contact with brush 34. Otherwise the operation of controller 20 is the same as that of controller 21.

Referring to Fig. 1 it will be seen that the electric motor M having the armature A is provided with two field windings F and F′. When one of these field windings is energized the motor will rotate in one direction and when the other winding is energized the motor will rotate in the opposite direction. The contact 32 is connected to one side of the line while one terminal of the motor armature is connected to the other side of the line. One field winding F′ of the motor is connected with the brush 35 which slides in the groove 36 on the conducting ring 26 of the controller 21. The other field F is connected with the brush 34. The contact 24 of the controller 21 is electrically connected with the brush 33 of the controller 20. Electrical connection is made to the contacts 24 and 32 through brushes (not shown) sliding in grooves 36 and 37 respectively.

It will be observed that the energization of both the field windings F and F′ depends primarily upon the contact 32. In order that the field F′ shall be energized, it is essential that the brush 32 be in a position in which the field winding F is deenergized. In other words, when the field winding F is energized, the winding F′ cannot be energized even though the contact 24 of the controller 21 be in engagement with the conducting ring 26, since the circuit of the field F′ is made through the contact surface 28 and brush 33.

The mode of operation of my device as thus constructed and arranged is as follows: Assuming that the spring drum of an ordinary clock mechanism, as it runs down the contact 32, travels around in the direction of the arrow c until it finally snaps off the end of the insulating rib and engages the conducting ring 31. This completes a circuit from the positive side of the line to brush 34, field F and armature A to the negative side of the line. This will cause the motor to rotate in a direction to drive the controller 20 in the direction of the arrow d until the motor is stopped by the contact reaching the end of the rib. While the motor is rotating in this direction driving through the ratchet mechanism 19′, the ratchet mechanism 19 is slipping or ratcheting. In like manner, when the spring in the drum 11 runs down to the proper point a circuit will be closed from the positive side of the line to contact surface 28, brush 33, contact 24, brush 35, field F′, and armature A, to the negative side of the line. This will cause the motor to rotate in the opposite direction, whereupon the pinion 16 will be operated and wind the spring within the drum 11, the ratchet mechanism 19′ now slipping or ratcheting. If while the spring mechanism 10 is being wound, the contacts on the mechanism should close, no circuit will be closed until the winding of the mechanism 10 is completed.

It will be seen that I have provided a simple arrangement whereby two mechanisms may be wound with a single motor, and while I have described my invention as embodied in concrete form and as operating in a specific manner in accordance with the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. The combination with two power storing mechanisms, of means for winding the same comprising a reversible electric motor, driving connections whereby the motor winds one mechanism when it rotates in one direction and the other mechanism when it rotates in the opposite direction, and circuit controlling means associated with each mechanism for controlling the motor circuit in the winding direction for said mechanisms.

2. The combination with two power storing mechanisms, of means for winding the same comprising a reversible electric motor, circuit controlling means associated with each of said mechanisms one for controlling the motor circuit for one direction of rotation and the other for controlling the motor circuit for the opposite direction of rotation, and ratchet driving connections between the motor and said mechanisms whereby one of said mechanisms is wound while the driving connection of the other is inoperative for each direction of rotation of the motor.

3. The combination with two power storing mechanisms, of means for winding the same comprising a reversible electric motor, circuit controlling means associated with each of said mechanisms one for closing a circuit for one direction of rotation and the other for closing a circuit for the opposite direction of rotation, and driving connections between the motor and said mechanisms whereby one of said mechanisms is wound when the motor is driven in one direction and the other mechanism is wound when the motor is driven in the opposite direction.

4. The combination with two power storing mechanisms, of means for winding the same comprising an electric motor having two field coils one for each direction of rotation of the motor, driving connections whereby the motor winds one mechanism when it rotates in one direction and the other mechanism when it rotates in the opposite direction, and circuit controlling means associated with each mechanism for controlling the circuit through the field coil which drives the motor in a direction to wind said mechanism.

5. The combination with two power storing mechanisms, of means for winding the same comprising an electric motor having two field coils one for each direction of rotation of the motor, driving connections whereby the motor winds one mechanism when it rotates in one direction and the other mechanism when it rotates in the opposite direction, a switching device associated with each mechanism for controlling the circuit through the field coil which drives the motor in the direction to wind said mechanism, and connections whereby the closing of the circuit of one of said field coils interrupts the circuit of the other field coil.

6. The combination with two power storing mechanisms, of means for winding the same comprising an electric motor, circuit controlling means associated with each mechanism for controlling the motor circuit, and driving connections whereby the motor winds one mechanism when the motor circuit is closed through one controlling means and winds the other mechanism when the motor circuit is closed through the other controlling means.

In witness whereof, I have hereunto set my hand this 17th day of May, 1912.

FRANK J. SEABOLT.

Witnesses:
HELEN ORFORD,
BENJAMIN B. HULL.